United States Patent
Chaudhary et al.

(10) Patent No.: US 8,605,828 B2
(45) Date of Patent: Dec. 10, 2013

(54) BLIND MECHANISM FOR DEMODULATING OFFSET QPSK SIGNALS IN THE PRESENCE OF CARRIER PHASE ERROR

(75) Inventors: Sartaj Chaudhary, Mumbai (IN); Vijaya Yajnanarayana, Bangalore (IN); I Zakir Ahmed, Bangalore (IN)

(73) Assignee: National Instruments Corporation, Austin, TX (US)

( * ) Notice: Subject to any disclaimer, the term of this patent is extended or adjusted under 35 U.S.C. 154(b) by 2 days.

(21) Appl. No.: 13/398,936

(22) Filed: Feb. 17, 2012

(65) Prior Publication Data
US 2013/0216005 A1    Aug. 22, 2013

(51) Int. Cl.
*H04L 27/22* (2006.01)
*H04B 1/10* (2006.01)

(52) U.S. Cl.
USPC .......................................... 375/329; 455/302

(58) Field of Classification Search
USPC ......... 375/329, 233, 259, 260, 261, 316, 324, 375/326, 346, 376; 455/33, 302, 304, 315
See application file for complete search history.

(56) References Cited

U.S. PATENT DOCUMENTS

| | | | | |
|---|---|---|---|---|
| 5,812,615 A | * | 9/1998 | Baum et al. | 375/344 |
| 6,714,776 B1 | * | 3/2004 | Birleson | 455/302 |
| 2011/0182387 A1 | | 7/2011 | Ahmed et al. | |

OTHER PUBLICATIONS

Oerder, Martin; Meyr, Heinrich; "Digital Filter and Square Timing Recovery;" IEEE Transactions on Communications, vol. 36, No. 5, May 1988; pp. 605-612.

"Phase-shift Keying;" Wikipedia, retrieved from <http://en.wikipedia.org/wiki/Phase-shift_keying> on Jan. 3, 2012; pp. 1-17.

* cited by examiner

*Primary Examiner* — Khai Tran
(74) *Attorney, Agent, or Firm* — Meyerton Hood Kivlin Kowert & Goetzel, P.C.; Jeffrey C. Hood; Mark K. Brightwell

(57) ABSTRACT

A computer-implemented system and method for blind demodulation of an offset QPSK input signal, involving repeatedly performing a set of operations, including: (a) applying a phase correction to the input signal based on an estimate of a carrier phase offset of the input signal to obtain a first modified signal; (b) shifting a quadrature component of the first modified signal by half a symbol period relative to an inphase component to obtain a second modified signal; (c) extracting a first sequence of symbols from the second modified signal, where the extraction includes estimating a symbol timing offset from the second modified signal; (d) performing hard-decision demodulation on the first sequence of symbols to obtain a second sequence of reference symbols; (e) computing a phase difference between the first sequence of symbols and second sequence of reference symbols; and (f) updating the carrier phase offset estimate using the phase difference.

22 Claims, 6 Drawing Sheets

BLIND MECHANISM FOR DEMODULATING OFFSET QPSK SIGNALS IN THE PRESENCE OF CARRIER PHASE ERROR

FIELD OF THE INVENTION

The present invention relates to the field of telecommunication, and more specifically, to a system and method for blind demodulation of an offset QPSK signal.

DESCRIPTION OF THE RELATED ART

The notion of offset QPSK is well known in the field of communication. (QPSK is an acronym for "quadrature phase shift keying".) An offset QPSK signal may be derived from a QPSK signal by shifting the quadrature component of the QPSK signal by half a symbol period with respect to the inphase component. The shifting implies that the resulting offset QPSK signal undergoes phase changes up to twice as often. However, the phase changes are limited to at most 90 degrees because only one component can changes at any given symbol transition time. Offset QPSK is used, e.g., in IS95 and ZIGBEE.

Blind demodulation is the process of demodulating a received signal without using any synchronization or recovery aids such as a preamble or a pilot. There exist methods for performing blind demodulation on QPSK signals. These methods can be adapted for use on offset-QPSK signals. Since an offset-QPSK signal has its Q component delayed by half the symbol time relative to its I component, the offset QPSK signal may be transformed into a QPSK signal by reversing (i.e., advancing) the Q-component delay. Then a blind QPSK-demodulation method may be performed, e.g., for reference recovery and signal fidelity analysis. However, this approach is complicated by the fact that the receiver's carrier phase does not exactly match the transmitter's carrier phase. Thus, there will be in general an arbitrary phase offset. Thus, there exists a need for systems and methods capable of demodulating an offset-QPSK signal in the presence of arbitrary phase offsets.

SUMMARY

In one set of embodiments, a method for demodulating an offset QPSK signal may involve the following processes.

The method may involve receiving an input signal from a channel, where the input signal corresponds to an offset QPSK signal that has been transmitted onto the channel by a transmitter.

The method may also involve capturing a block of samples of the input signal.

The actions of receiving the input signal and capturing the block of samples may be performed by a receiver (e.g., a receiver that is included as part of an offset QPSK modem).

The method may also involve repeatedly performing a set of operations, where the set of operations includes: (a) applying a phase correction to the block of samples of the input signal based on a current estimate of a carrier phase offset of the input signal in order to obtain a first modified block of samples; (b) shifting a quadrature component of the first modified block of samples by half a symbol period relative to an in-phase component of the first modified block in order to obtain a second modified block of samples; (c) extracting a first sequence of symbols from the samples of the second modified block, wherein said extracting includes estimating a symbol timing offset based on the samples of the second modified block; (d) performing hard-decision demodulation on the first sequence of symbols to obtain a second sequence of reference symbols; (e) computing a phase difference between the first sequence of symbols and second sequence of reference symbols; and (f) updating the current estimate of the carrier phase offset using the phase difference.

In some embodiments, the action of repeatedly performing the set of operations may include repeatedly performing the set of operations until a magnitude of the phase difference is smaller than a threshold.

After the action of repeatedly performing the set of operations, the first sequence of the symbols and the second sequence of the reference symbols are usable to determine a measure of quality of a communication system comprising the transmitter, the channel and the receiver.

In some embodiments, the method may also include computing the measure of quality based on the first sequence of the symbols and the second sequence of the reference symbols after said repeatedly performing the set of operations.

In some embodiments, the method may also include outputting a decision on whether to accept or reject the transmitter based on the measure of quality.

In some embodiments, the measure of quality is error vector magnitude (EVM).

In some embodiments, the method may also include displaying a two-dimensional constellation plot showing the first sequence of the symbols.

In some embodiments, the action of estimating the symbol timing offset may be performed using the algorithm disclosed in "Digital Filter and Square Timing Recovery" by Martin Oerder and Heinrich Meyer, IEEE Transactions on Communications, Vol. 36, No. 5, May 1988.

In some embodiments, for a first performance (i.e., first iteration) of said set of operations, the current estimate of the carrier phase offset may be determined using the method disclosed in:

U.S. patent application Ser. No. 12/694,388, filed on Jan. 27, 2010, entitled "A Blind Mechanism for the Joint Estimation of Frequency Offset and Phase Offset for QAM Modulated Signals", invented by Ahmed, Bharadwaj and Yajnanarayana. (This Application is hereby incorporated by reference in its entirety.)

In some embodiments, after said repeatedly performing the set of operations, the second sequence of the reference symbols may be used to estimate original information bits that have been embedded in the offset QPSK signal by the transmitter.

In some embodiments, a computer system may be configured to perform the method in response to the execution of program instructions stored in a memory medium.

In some embodiments, the method may be represented in terms of computer-executable program instructions that are stored in a memory medium.

BRIEF DESCRIPTION OF THE DRAWINGS

A better understanding of the present invention can be obtained when the following detailed description of the preferred embodiments is considered in conjunction with the following drawings.

Figure 1:
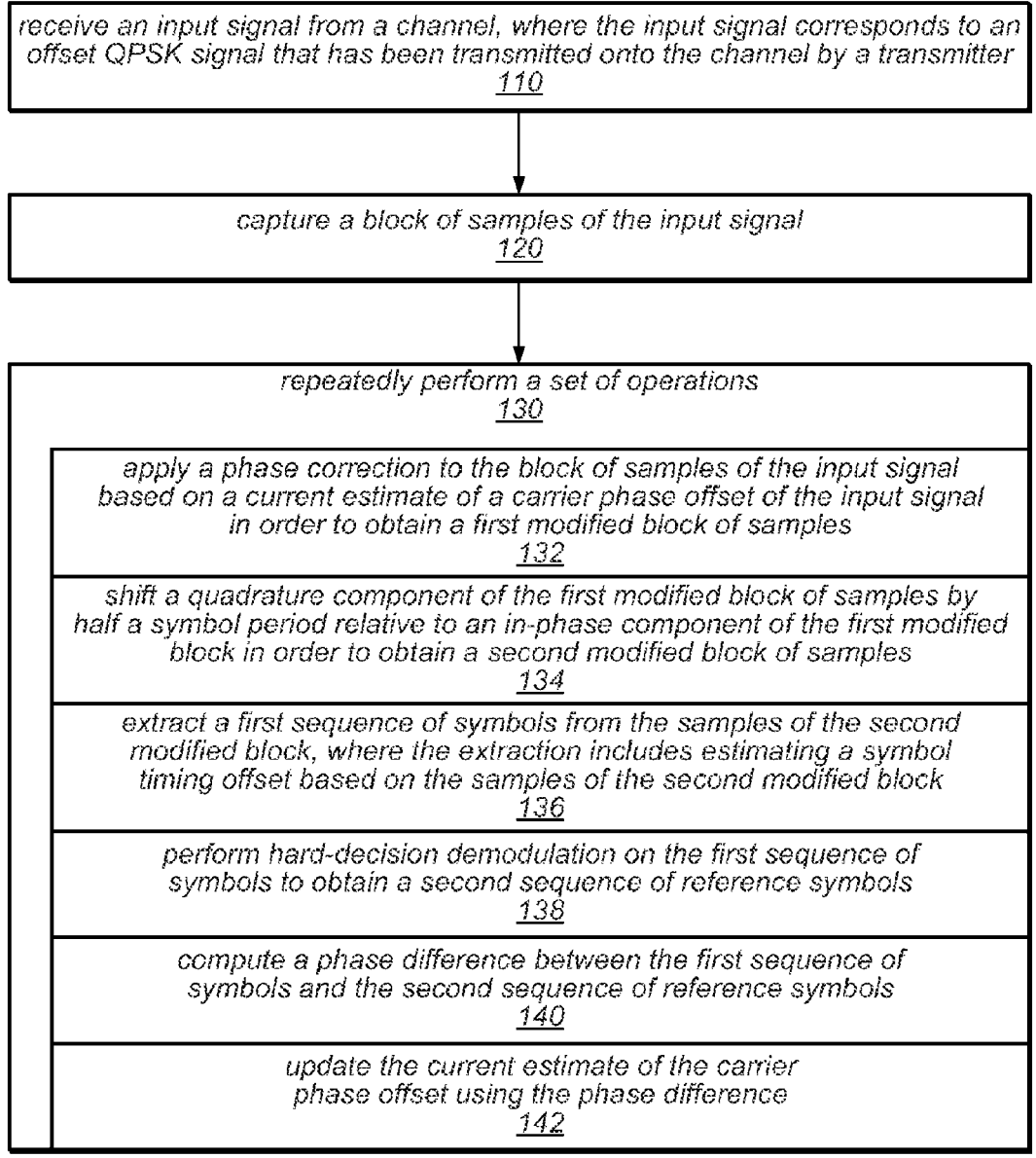
FIG. 1 illustrates one set of embodiments of a method 100 for demodulating a received offset QPSK signal.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge, magnetization state, and/or, other physical quantities; media fabricated based on controlled variation of properties such as surface height, thickness, curvature or roughness; media fabricated using various lithographic techniques; etc. The term "memory medium" also includes within its scope of meaning the possibility that a memory medium may comprise a set of two or more memory media residing at different locations, e.g., at different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" means: 1) a software program which may be stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor. Exemplary software programs include: programs written in text-based programming languages such as C, C++, Java™, Pascal, Fortran, etc.; graphical programs (programs written in graphical programming languages); assembly language programs; programs that have been compiled to machine language; scripts; and other types of executable software. A software program may comprise two or more subprograms that interoperate in some manner.

Computer System—any of various types of computing or processing systems, including a personal computer (PC), a mainframe computer system, a workstation, a laptop, a network appliance, an Internet appliance, a hand-held device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

In some embodiments, a set of computers distributed across a network may be configured to partition the effort of executing a computational method (e.g., any of the method embodiments disclosed herein). In some embodiments, a first computer may be configured to receive an O-QPSK modulated signal and to capture samples of that signal. The first computer may send the samples to a second computer through the network. The second computer may operate on the samples according to any of the method embodiments described herein, or, any combination of the method embodiments described herein, or, any subset of any of the method embodiments described herein, or, any combination of such subsets.

In one set of embodiments, a method 100 may include the actions shown in FIG. 1. Parts of the method 100 may be performed by a computer system comprising one or more processors in response to the execution of program instructions stored in a memory. Other parts of the method 100 may be performed by a receiver system.

At 110, an input signal may be received from a channel (i.e., a communication channel). The channel may be a wired channel (e.g., a cable connection) or a wireless channel. The input signal may correspond to an offset QPSK signal that has been transmitted onto the channel by a transmitter. In other words, the input signal may be noise-distorted version of the transmit signal, which has traversed the channel. (QPSK is an acronym for "quadrature phase shift keying".) The transmitter may generate the offset QPSK signal from a complex baseband signal (e.g., from a QPSK signal) by shifting the Q component of the complex baseband signal by 90 degrees with respect to the I component of the complex baseband signal (or vice versa).

At 120, a block of samples of the input signal may be captured. The samples of the block may be captured at a rate that is at least two times a symbol rate of the complex baseband signal. In some embodiments, the sample rate is an integer multiple of the symbol rate:

Sample_Rate=$n_{OS}$*Symbol_Rate, where $n_{OS}>1$ is an integer oversampling ratio.

The actions 110 and 120 may be performed by a receiver, e.g., a receiver as variously described herein. The samples of the block are complex samples. Each complex sample has an in-phase component and a quadrature component. (The notion of capturing complex samples as part of a receiver's action of demodulating a received signal is well understood in the art of signal processing.)

At 130, the computer system may repeatedly perform a set of operations. The set of operations may include the operations 132 through 142 shown in FIG. 1.

At 132, the computer system may apply a phase correction to the block of samples of the input signal based on a current estimate of a carrier phase offset of the input signal in order to obtain a first modified block of samples. The carrier phase offset may include a phase offset between the transmitter's carrier signal and the receiver's carrier signal. In a first performance (i.e., iteration) of the set of operations, the current estimate of the carrier phase offset may be determined by the estimation method disclosed in:

U.S. patent application Ser. No. 12/694,388, filed on Jan. 27, 2010, entitled "A Blind Mechanism for the Joint Estimation of Frequency Offset and Phase Offset for QAM Modulated Signals", invented by Ahmed, Bharadwaj and Yajnanarayana. (application Ser. No. 12/694, 388 is hereby incorporated by reference in its entirety.)

Hereinafter, this estimation method will be referred to as the ABY method. The ABY method may provide a coarse estimate of the carrier phase offset. Then the action of repeatedly performing the set of operations may cause the estimate of the carrier phase offset to converge to the true carrier phase offset.

At 134, the computer system may shift a quadrature component of the first modified block of samples by half a symbol period relative to an in-phase component of the first modified block in order to obtain a second modified block of samples. If the current estimate of the carrier phase offset were perfect, this shift operation would result in a QPSK signal. In the first performance of the set of operations, the current estimate of the carrier phase offset may be crude, and thus, the second modified block of samples may be a crude approximation of a QPSK signal, albeit good enough to serve as a basis for convergence to better approximations.

At 136, the computer system may extract a first sequence of symbols from the samples of the second modified block. The extraction may include (as an intermediate step) estimating a symbol timing offset based on the samples of the second modified block. The estimation of the symbol timing offset may be performed using a conventional method such as the method disclosed in "Digital Filter and Square Timing Recovery" by Martin Oerder and Heinrich Meyer, IEEE Transactions on Communications, Vol. 36, No. 5, May 1988. This estimation method will be referred to hereinafter as the Oerder-Meyer algorithm. The decimator will decimate the samples of second modified block at the estimated offset to obtain first sequence of symbol values.

At 138, the computer system may perform hard-decision demodulation on the first sequence of symbols to obtain a second sequence of reference symbols.

At 140, the computer system may compute a phase difference (also referred to herein as "phase error") between the first sequence of symbols and second sequence of reference symbols.

At 142, the computer system may update the current estimate of the carrier phase offset using the phase difference. For example, the current estimate may be updated by adding the phase difference:

current_estimate←current_estimate+phase_difference.

After repeatedly performing the set of operations (e.g., after a convergence condition is satisfied), the first sequence of symbols and second sequence of reference symbols are usable to determine (i.e., compute) a measure of quality of a communication system comprising the transmitter, the channel and the receiver. In some embodiments, the quality measure is error vector magnitude.

The action of repeatedly performing the set of operations may comprise repeatedly performing the set of operations until a convergence condition is satisfied. For example, the set of operations may be repeatedly performed until the phase difference (computed at 142) is smaller in magnitude than a specified threshold. As another example, the set of operations may be repeatedly performed until the average of the magnitudes of the last M phase differences (computed in the last M performances of operation 142) is smaller in than a specified threshold, where M>1. As yet another example, the set of operations may be performed a specified number of times. As yet another example, the set of operations may be repeatedly performed until a specified amount of processing time has expired.

In some embodiments, the method 100 may also include computing the measure of quality based on the first sequence of symbols and second sequence of reference symbols. This computation may be performed after the action of repeatedly performing the set of operations. The measure of quality may be outputted to a display device.

In some embodiments, the method 100 may also include displaying a two-dimensional constellation plot showing the first sequence of symbols, e.g., after said repeatedly performing the set of operations.

In some embodiments, the method 100 may include displaying a dynamic constellation plot that shows the evolution of the first sequence of symbols as a function of the loop index (i.e., the index of the loop that repeatedly performs the set of operations).

In some embodiments, the method 100 may be included as part of a receiver test application. The receiver test application may involve directing a transmitter to transmit an offset QPSK signal to a receiver (or device) under test. The method 100 may be used to determine (or verify) the quality of the receiver (or device) under test. Thus, the method 100 may include computing the measure of quality and outputting a decision on whether to accept or reject the receiver based on the measure of quality. (The receiver may be accepted if its quality measure exceeds a specified threshold.) The receiver test application may be applied to each receiver in a sequence of manufactured receivers, e.g., in the context of an assembly line.

In some embodiments, the method 100 may be included as part of a transmitter test application. The transmitter test application may involve directing a transmitter under test to transmit an offset QPSK signal to a receiver. The method 100 may be used to determine (or verify) the quality of the transmitter. Thus, the method 100 may include computing the measure of quality as described above, and outputting a decision on whether to accept or reject the transmitter based on the measure of quality. (The transmitter may be accepted if its quality measure exceeds a specified threshold.) The transmitter test application may be applied to each transmitter in a sequence of manufactured transmitters, e.g., in the context of an assembly line.

In some embodiments, the method 100 may be included as part of a signal analysis system that is configured to identify the modulation types of received signals from a set of possible modulation types. If the modulation type of a given signal is identified by to O-QPSK, then the method 100 may be used to demodulate the information bits carried by the received O-QPSK signal.

After the action of repeatedly performing the set of operations, the second sequence of reference symbols are usable to estimate the original information bits that have been embedded in the offset QPSK signal by the transmitter. In some embodiments, method 100 may include that action of estimating the original information bits. For example, the original information bits may be estimated by performing symbol demodulation on the second sequence of reference symbols using a QPSK constellation.

Figure 2:
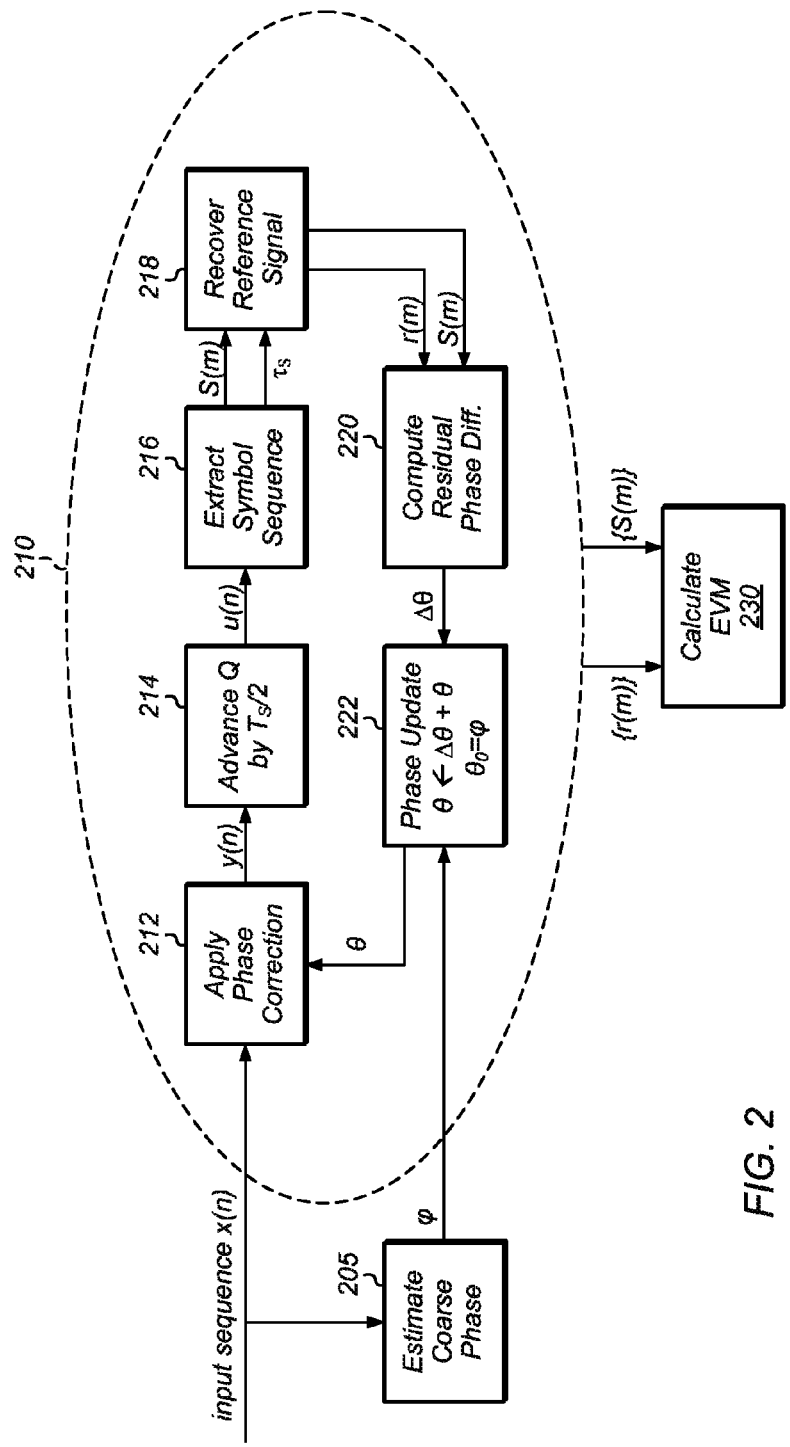
FIG. 2 illustrates one embodiment of a method 200 for computing an error vector magnitude for a received offset QPSK signal.

FIG. 2 illustrates a method 200. Method 200 may be interpreted as an embodiment of method 100, and may incorporate any subset of the features described above in connection with method 100. The method 200 may be performed by a computer system operating under the control of program instructions stored in a memory.

Figure 3:
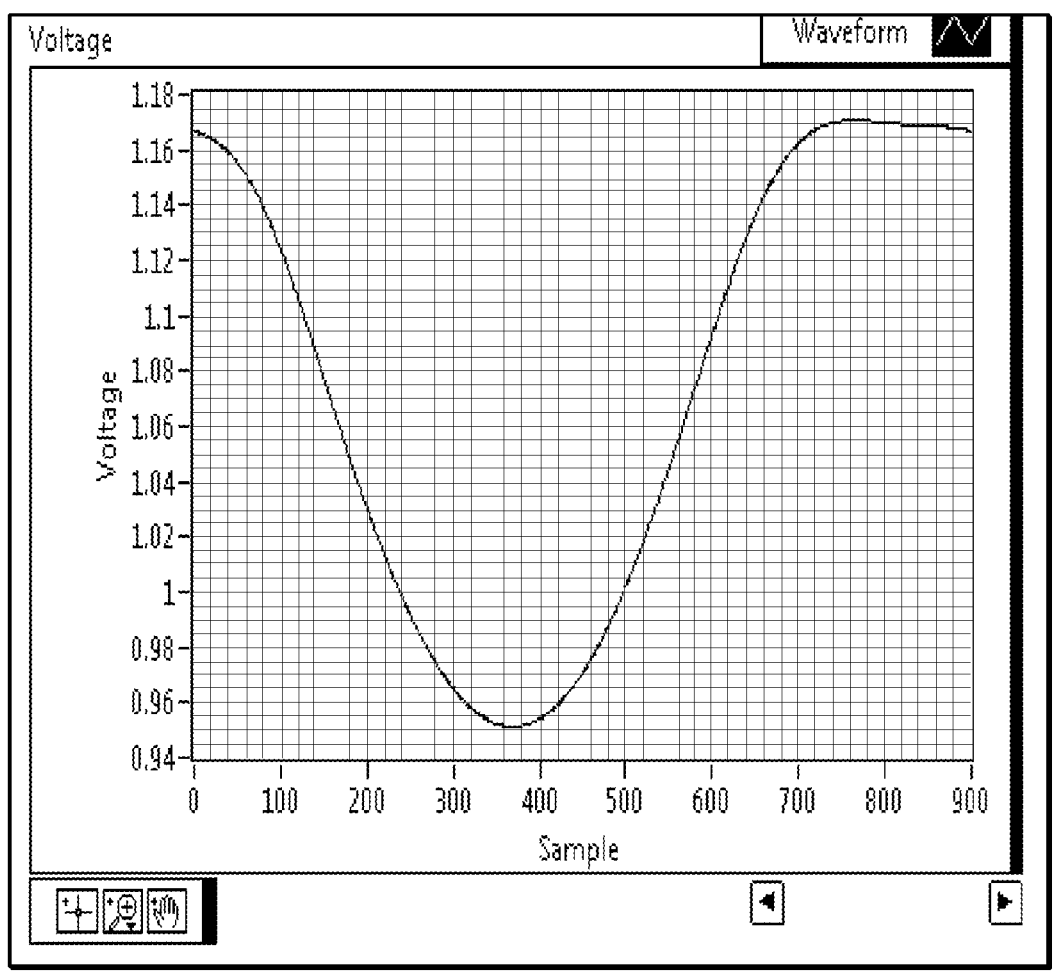
FIG. 3 is a graph of a cost function J that is used to determine an initial estimate of the carrier phase offset of the offset QPSK signal.

At 205, the computer system may generate a coarse estimate $\phi$ for the phase offset of the input signal based on the samples $\{x(n)\}$ of the input signal. As described above, the coarse estimate may be obtained by performing the ABY method. In one embodiment, the ABY method involves minimizing the cost function $J(\phi, \omega)$ over an angle-frequency domain. (In this embodiment, the method 200 may perform a frequency correction in addition to the phase correction 212.) In another embodiment, the ABY method may involve minimizing the cost function $J(\phi, \omega)$ only over the parameter $\phi$. (This assumes that the $\omega$ parameter is already known to sufficient accuracy.) FIG. 3 shows a graph of the cost function $J(\phi, \omega)$ as a function of $\phi$ (parameterized by sample index) according to one embodiment. The minimizing value of the parameter $\phi$ may be supplied to the loop 210, e.g., for use in the first iteration of the loop.

At 212, the computer system may apply a phase correction to the input sequence $x(n)$ based on the current estimate $\theta$ of the phase offset. In the first iteration, the current estimate may be set equal to $\phi$. (While $\phi$ may be a coarse estimate for the phase offset, succeeding iterations of the loop 210 will drive the estimate towards the actual phase offset.) The computer system may apply the phase correction based on the expression:

$$y(n)=x(n)\exp\{-j\theta\}$$

At 214, the computer system may advance the Q component of the phase-corrected signal $y(n)$ by one half the symbol period $T_S$ relative to the I component to obtain a signal $u(n)$.

At 216, the computer system may extract a symbol sequence $S(m)$ from the signal $u(n)$. (The index m is a symbol index.) The extraction process may involve computing an estimate $\tau_S$ of the symbol timing offset of the signal $u(n)$ using the Oerder-Meyer algorithm. For example, in one embodiment, the symbol timing offset may be estimated by computing the sequence $\{v_k\}$ according to the relation $$v_k=|u(k)|^2,$$

and then computing the phase of the sequence $\{v_k\}$ at frequency $1/T_S$. This phase may be used as the estimate $\tau_S$ for the symbol timing offset. The estimate $\tau_S$ may not be perfect, but gets better as the loop iteration index increases.

After computing the estimate $\tau_S$, the computer system may generate the symbol sequence $S(m)$ by sampling the signal $u(n)$ at times $n=n_{OS}m+\tau_S$. (The constant $n_{OS}$ is the oversampling ratio.) If the time $n_{OS}m+\tau_S$ is not an integer, the symbol value $S(m)$ may be interpolated based on nearby samples of the signal $u(n)$.

At 218, the computer system may generate a reference signal $r(m)$ from the symbol sequence $S(m)$. The reference signal may be generated by performing hard decision demodulation on the symbol sequence $S(m)$, i.e., by mapping each of the symbol values $S(m)$ to the nearest constellation point $r(m)$ in the QPSK constellation.

At 220, the computer system may compute a residual phase difference $\Delta\theta$ between the symbol sequence $S(m)$ and the reference signal $r(m)$. For example, the residual phase difference may be computed according to the expression:

$$\Delta\theta=\text{mean}\{r(m)S(m)^*\},$$

where the superscript "*" denotes complex conjugation.

At 222, the computer system may update the current estimate $\theta$ of the phase offset based on the residual phase difference $\Delta\theta$, e.g., according to the relation:

$$\theta \leftarrow \theta+\Delta\theta.$$

The updated value may be used in the next iteration of the phase correction step 212.

As the number of iterations of loop 210 increases, the residual phase difference $\Delta\theta$ may decrease in size. When the residual phase difference becomes sufficiently small in size, the loop 210 may exit. Once this convergence condition is satisfied, the reference signal $\{r(m)\}$ may be relied upon as a correct reference, i.e., as a correct representation of the QPSK symbol sequence that was used by the transmitter to generate the offset QPSK signal. Furthermore, the symbol sequence $\{S(m)\}$ and the reference signal $\{r(m)\}$ may be used to compute an error vector magnitude, e.g., according to the expressions:

$$P_{ERROR} = \sqrt{\frac{1}{N_S}\sum_{m=1}^{N_S}|S(m)-r(m)|^2},$$

$$P_{REF} = \sqrt{\frac{1}{N_S}\sum_{m=1}^{N_S}|r(m)|^2},$$

$$EVM = P_{ERROR}/P_{REF},$$

where $N_S$ is the number of symbols in the symbol sequence $S(m)$. See block 230 of FIG. 2.

In some embodiments, the method 100 or the method 200 may be performed on a programmable hardware element (e.g., an FPGA).

In some embodiments, the method 100 or the method 200 may be realized on an application specific integrated circuit (ASIC).

In some embodiments, the method 100 or the method 200 may included as part of the software that is stored in a QPSK modem.

In some embodiments, the method 100 or the method 200 may be included as part of a communication software toolkit, which is sold as a software product.

Acceleration of Convergence

It has been observed that the residual phase difference $\Delta\theta$ follows a typical trajectory that is approximated by the function $\Delta\theta = C*\exp(-\sigma k)$, where $\sigma$ is a rate constant, where k is the loop iteration index, and C is the value of the residual phase difference computed in the first iteration of the loop. In some embodiments, $\sigma = 0.013$.

Figure 4:
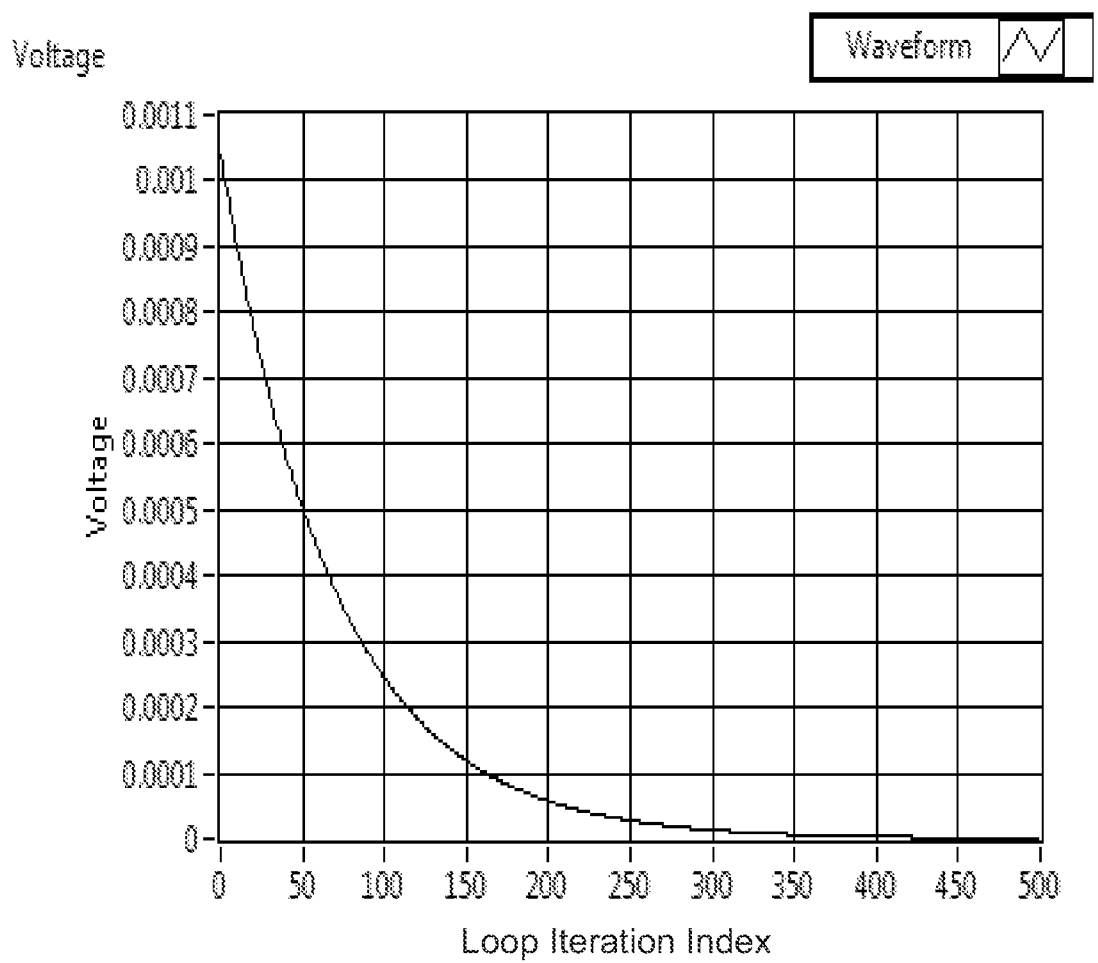
FIG. 4 illustrates a typical trajectory for the residual phase difference Δθ as a function of loop iteration index. (See FIG. 2 for a visualization of the loop.)

FIG. 4 shows the trajectory of the residual phase difference for a captured CDMA RC1 offset QPSK signal. To accelerate the convergence of method 200 (or method 100), the computer system may incorporate the following accelerative update (as an alternative to the normal update $\theta \leftarrow \theta + \Delta\theta$) in at least one iteration of the loop 210. In an attempt to jump immediately to final converged value of the phase offset, the accelerative update may have the form:

$$\theta \leftarrow \theta + \Delta\theta/\sigma.$$

(Note that the value $\Delta\theta/\sigma$ corresponds to the integral of $\Delta\theta*\exp(-\sigma k)$ from k equal to zero to $\infty$) By incorporating the accelerative update, the method 200 may converge much more quickly, i.e., with significantly fewer iterations.

In one embodiment, the accelerative update is performed in the first iteration of the loop, and normal updates are performed thereafter.

Figure 5:
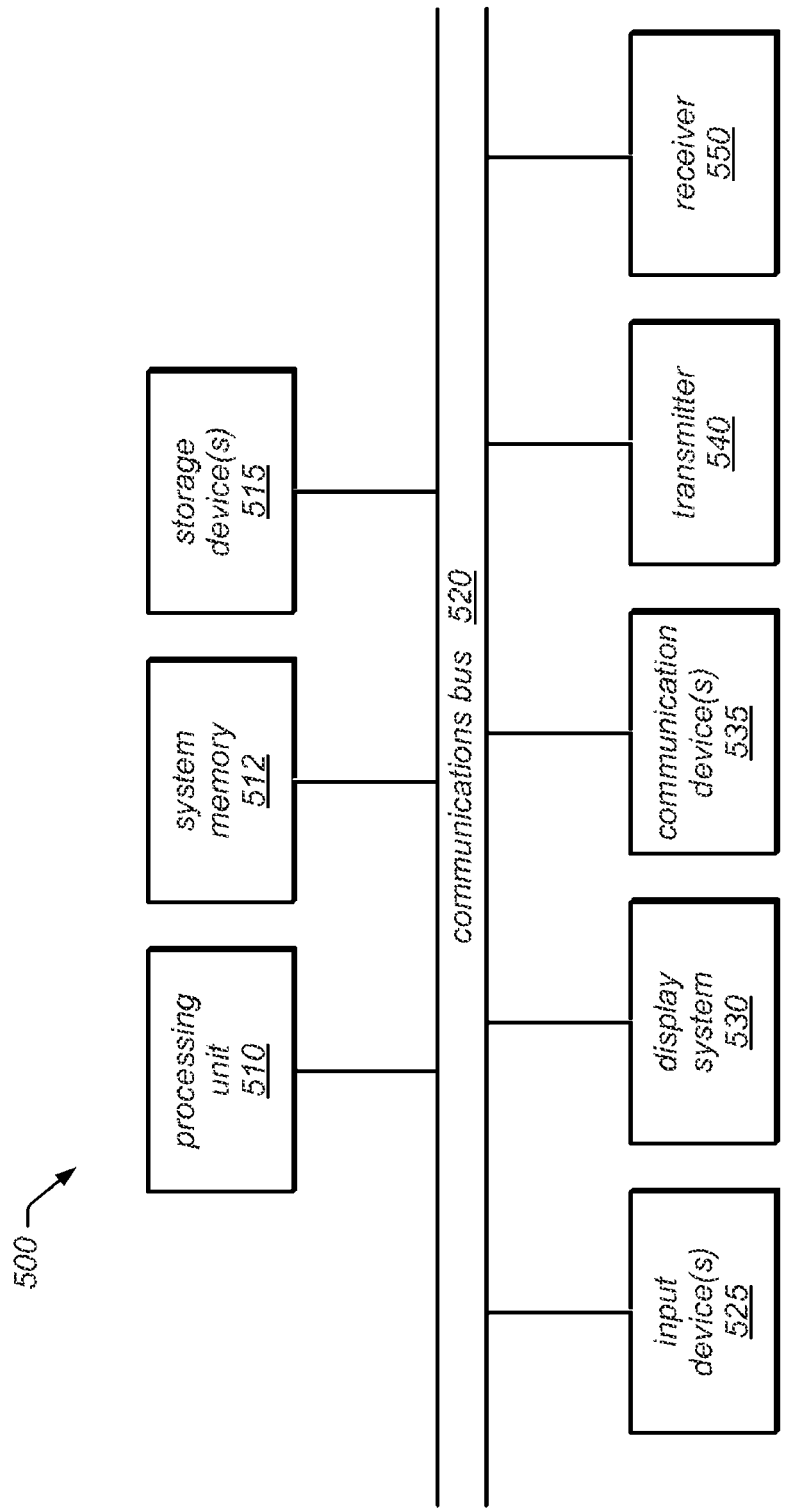
FIG. 5 illustrates one embodiment of a computer system 500 that may be used to perform any of the method embodiments described herein.

FIG. 5 illustrates one embodiment of a computer system 500 that may be used to perform any of the method embodiments described herein, or, any combination of the method embodiments described herein, or any subset of any of the method embodiments described herein, or, any combination of such subsets.

Computer system 500 may include a processing unit 510, a system memory 512, a set 515 of one or more storage devices, a communication bus 520, a set 525 of input devices, and a display system 530.

System memory 512 may include a set of semiconductor devices such as RAM devices (and perhaps also a set of ROM devices).

Storage devices 515 may include any of various storage devices such as one or more memory media and/or memory access devices. For example, storage devices 515 may include devices such as a CD/DVD-ROM drive, a hard disk, a magnetic disk drive, magnetic tape drives, etc.

Processing unit 510 is configured to read and execute program instructions, e.g., program instructions stored in system memory 512 and/or on one or more of the storage devices 515. Processing unit 510 may couple to system memory 512 through communication bus 520 (or through a system of interconnected busses). The program instructions configure the computer system 500 to implement a method, e.g., any of the method embodiments described herein, or, any combination of the method embodiments described herein, or, any subset of any of the method embodiments described herein, or any combination of such subsets.

Processing unit 510 may include one or more processors (e.g., microprocessors).

One or more users may supply input to the computer system 500 through the input devices 525. Input devices 525 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 530 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 500 may include other devices, e.g., devices such as one or more graphics accelerators, one or more speakers, a sound card, a video camera and a video card.

In some embodiments, computer system 500 may include one or more communication devices 535, e.g., a network interface card for interfacing with a computer network. As another example, the communication device 535 may include a specialized interface for communication via any of a variety of established communication standards or protocols (e.g., USB, Firewire, PCI, PCI Express, PXI).

The computer system may be configured with a software infrastructure including an operating system, and perhaps also, one or more graphics APIs (such as OpenGL®, Direct3D, Java 3D™). In some embodiments, the software infrastructure may include National Instruments LabVIEW™ software, and/or, LabVIEW™ FPGA.

In some embodiments, the computer system 900 may be configured for coupling to transmitter 540. The transmitter is configured to receive transmit a offset-QPSK signal onto a communication channel. The channel may be wireless channel or a wired channel. The transmitter may operate under the control of the software executing on processor 510 and/or software executing on the transmitter itself.

In some embodiments, the computer system 900 may be configured to interface with a receiver 550. The receiver may include an RF amplifier, local oscillator circuitry (for generating a local carrier signal), down-conversion circuitry (for converting a received RF signal to a complex baseband signal), and a pair of analog-to-digital converters (ADCs) for sampling the complex baseband signal. In some embodiments, the receiver may also include one or more programmable hardware elements and/or one or more microprocessors for performing digital processing on the samples of the complex baseband signal.

Figure 6:
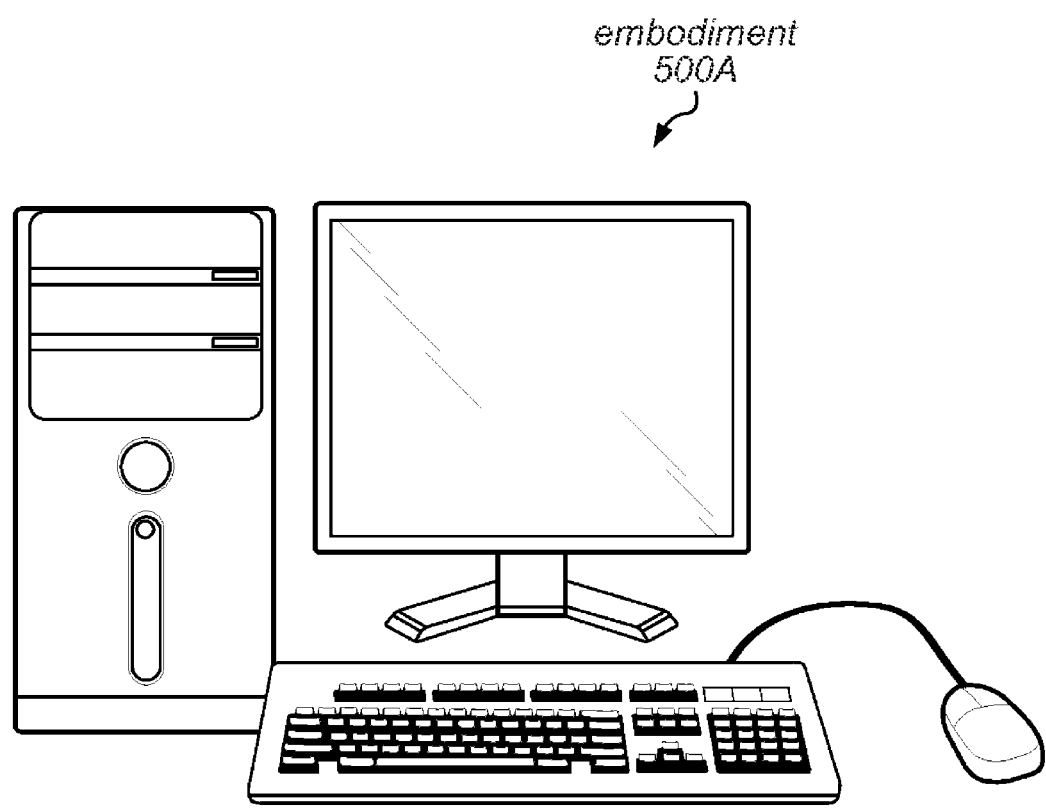
FIG. 6 illustrates an embodiment 500A of computer system 500.

FIG. 6 illustrates an embodiment 500A for computer system 500.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   receiving an input signal from a channel, wherein the input signal corresponds to an offset QPSK signal that has been transmitted onto the channel by a transmitter;
   capturing a block of samples of the input signal, wherein said receiving and said capturing are performed by a receiver;
   repeatedly performing a set of operations, wherein said repeatedly performing is performed by digital circuitry, wherein the set of operations includes:

(a) applying a phase correction to the block of samples of the input signal based on a current estimate of a carrier phase offset of the input signal in order to obtain a first modified block of samples;

(b) shifting a quadrature component of the first modified block of samples by half a symbol period relative to an in-phase component of the first modified block in order to obtain a second modified block of samples;

(c) extracting a first sequence of symbols from the samples of the second modified block, wherein said extracting includes estimating a symbol timing offset based on the samples of the second modified block;

(d) performing hard-decision demodulation on the first sequence of symbols to obtain a second sequence of reference symbols;

(e) computing a phase difference between the first sequence of symbols and second sequence of reference symbols;

(f) updating the current estimate of the carrier phase offset using the phase difference.

2. The method of claim 1, wherein said updating comprises updating the current estimate according to the expression:

$$\theta \leftarrow \theta + \Delta\theta/\sigma,$$

wherein $\theta$ is the current estimate, wherein $\Delta\theta$ is the phase difference, wherein $\sigma$ is an exponential rate constant.

3. The method of claim 1, wherein, after said repeatedly performing, the first sequence of the symbols and the second sequence of the reference symbols are usable to determine a measure of quality of a communication system comprising the transmitter, the channel and the receiver.

4. The method of claim 3, further comprising:
after said repeatedly performing, computing the measure of quality based on the first sequence of the symbols and the second sequence of the reference symbols.

5. The method of claim 4, further comprising:
outputting a decision on whether to accept or reject the transmitter based on the measure of quality.

6. The method of claim 3, wherein the measure of quality is error vector magnitude.

7. The method of claim 1, further comprising:
displaying a two-dimensional constellation plot showing the first sequence of the symbols.

8. The method of claim 1, wherein the transmitter generates the offset QPSK signal from a complex baseband signal, wherein the samples of said block are captured at a rate that is at least two times a symbol rate of the complex baseband signal.

9. The method of claim 1, wherein said estimating the symbol timing offset is performed using the Oerder-Meyer algorithm.

10. The method of claim 1, wherein, for a first performance of said set of operations, the current estimate of the carrier phase offset is determined using the ABY estimation method.

11. The method of claim 1, wherein, after said repeatedly performing, the second sequence of the reference symbols is usable to estimate original information bits that have been embedded in the offset QPSK signal by the transmitter.

12. The method of claim 1, wherein the digital circuitry includes one or more processors operating in response to the execution of stored program instructions.

13. The method of claim 1, wherein the digital circuitry includes one or more programmable hardware elements.

14. A non-transitory computer-readable memory medium storing program instructions executable by a processor, wherein the program instructions, if executed by the processor, cause the processor to:

receive an input signal from a channel, wherein the input signal corresponds to an offset QPSK signal that has been transmitted onto the channel by a transmitter;

capture a block of samples of the input signal, wherein said receiving and said capturing are performed by a receiver;

repeatedly perform a set of operations, wherein the set of operations includes:

(a) applying a phase correction to the block of samples of the input signal based on a current estimate of a carrier phase offset of the input signal in order to obtain a first modified block of samples;

(b) shifting a quadrature component of the first modified block of samples by half a symbol period relative to an in-phase component of the first modified block in order to obtain a second modified block of samples;

(c) extracting a first sequence of symbols from the samples of the second modified block, wherein said extracting includes estimating a symbol timing offset based on the samples of the second modified block;

(d) performing hard-decision demodulation on the first sequence of symbols to obtain a second sequence of reference symbols;

(e) computing a phase difference between the first sequence of symbols and second sequence of reference symbols; and (f) updating the current estimate of the carrier phase offset using the phase difference.

15. The memory medium of claim 14, wherein said repeatedly performing comprises repeatedly performing the set of operations until a magnitude of the phase difference is smaller than a threshold.

16. The memory medium of claim 14, wherein the program instructions, if executed by the processor, cause the processor to:
compute an error vector magnitude based on the first sequence of symbols and second sequence of reference symbols after said repeatedly performing.

17. The memory medium of claim 16, wherein the program instructions, if executed by the processor, cause the processor to:
output a decision on whether to accept or reject the transmitter based on the error vector magnitude.

18. The memory medium of claim 14, wherein the program instructions, if executed by the processor, cause the processor to:
display a two-dimensional constellation plot showing the first sequence of symbols.

19. The memory medium of claim 14, wherein the transmitter generates the offset QPSK signal from a complex baseband signal, wherein the samples of said block are captured at a rate that is at least two times a symbol rate of the complex baseband signal.

20. The memory medium of claim 14, wherein said estimating the symbol timing offset is performed using the Oerder-Meyer algorithm.

21. The memory medium of claim 14, wherein, for a first performance of said set of operations, the current estimate of the carrier phase offset is determined using the ABY estimation method.

22. A system comprising:
a processor; and
a memory storing program instructions, wherein the program instructions, if executed by the processor, cause the processor to:

receive an input signal from a channel, wherein the input signal corresponds to an offset QPSK signal that has been transmitted onto the channel by a transmitter;

capture a block of samples of the input signal, wherein said receiving and said capturing are performed by a receiver;

repeatedly perform a set of operations, wherein the set of operations includes: (a) applying a phase correction to the block of samples of the input signal based on a current estimate of a carrier phase offset of the input signal in order to obtain a first modified block of samples; (b) shifting a quadrature component of the first modified block of samples by half a symbol period relative to an in-phase component of the first modified block in order to obtain a second modified block of samples; (c) extracting a first sequence of symbols from the samples of the second modified block, wherein said extracting includes estimating a symbol timing offset based on the samples of the second modified block; (d) performing hard-decision demodulation on the first sequence of symbols to obtain a second sequence of reference symbols; (e) computing a phase difference between the first sequence of symbols and second sequence of reference symbols; and (f) updating the current estimate of the carrier phase offset using the phase difference.

* * * * *